United States Patent [19]

Rogers

[11] 3,952,855
[45] Apr. 27, 1976

[54] HIGH SPEED BOTTLE TRANSFER MACHINE

[75] Inventor: James H. Rogers, Lebanon Junction, Ky.

[73] Assignee: Mac Manufacturing Company, Inc., Lebanon Junction, Ky.

[22] Filed: Aug. 20, 1974

[21] Appl. No.: 498,995

[52] U.S. Cl. ................................. 198/32; 198/34
[51] Int. Cl.² ....................................... B65G 47/30
[58] Field of Search ............... 198/28, 32, 34, 37, 198/185, 188

[56] References Cited
UNITED STATES PATENTS

| | | | |
|---|---|---|---|
| 2,459,264 | 1/1949 | Cerruti | 198/32 |
| 2,575,220 | 11/1951 | Hiller | 198/32 |
| 2,897,947 | 8/1959 | Krupp et al. | 198/28 |
| 2,912,093 | 11/1959 | Lauck | 198/32 |
| 3,178,006 | 4/1965 | Nigrelli et al. | 198/32 |
| 3,232,411 | 2/1966 | Kulig | 198/32 |
| 3,351,175 | 11/1967 | Erickson et al. | 198/32 |

Primary Examiner—John J. Love
Assistant Examiner—Jeffrey V. Nase
Attorney, Agent, or Firm—Wm. R. Price

[57] ABSTRACT

Discloses a machine for feeding groups of bottles in one-by-one fashion onto an outlet conveyor. The machine involves the use of a spacing conveyor interposed between the feed conveyor and an outlet conveyor and channel means disposed over the end of the feed conveyor so as to orient the groups of bottles in side-by-side rows. Spacing guides are positioned on the spacing conveyor at an angle so that a row of the bottles in side-by-side relationship are retained on the spacing conveyor while the foremost row is angled so that the bottles reach the output belt at different times and can then be carried away one at a time. The spacing guides are angled so that the last bottle in one row is fed onto the outlet conveyor before the first bottle of the next row is fed onto the outlet conveyor.

11 Claims, 5 Drawing Figures

HIGH SPEED BOTTLE TRANSFER MACHINE

FIELD OF THE INVENTION

This invention relates to a bottle orientation mechanism and more particularly to a machine for receiving a variety of bottles from a carton unloader and arranging said bottles in side-by-side rows so as to feed them in timed manner onto a conveyor or the like.

BACKGROUND

Empty bottles are dumped from cases onto a conveyor prior to their being filled. These bottles are thus lined up on the belt in the same pattern that they were in the carton. The problem is to get the bottles into a single line to be fed to the filling equipment. The best solution is to release the bottles onto an outlet conveyor one at a time to avoid two bottles reaching the same point at the same time and jamming. In instances involving pint and half pint bottles, for example, there is an additional problem of turning the bottles in a direction approaching 90° to be fed onto the outlet conveyor. Some approaches have been made for this latter problem, thus for example, Lauck in U.S. Pat. No. 2,912,093, provided a mechanism for engaging bottles from a feed conveyor by projecting fingers and moving same across a dead space onto an outlet conveyor in such a manner that the bottles were actually turned and fed onto the outlet conveyor in one-by-one fashion. Note also the patent to Hiller, U.S. Pat. No. 2,575,220. Other proposals pertaining to round bottles have been made by Cerruti in U.S. Pat. No. 2,459,264 and by Erickson et.al. in U.S. Pat. No. 3,351,175. The latter patent proposes a system whereby the bottles are fed onto a series of channel members and held in position by gates which are sequentially opened to allow the bottles to feed onto the outlet conveyor in one-by-one manner. None of these proposals to the inventor's knowledge have been altogether satisfactory in providing a high-speed, jam proof conveying mechanism.

SUMMARY OF THE INVENTION

According to the present invention, the bottles after being unloaded from the carton onto the feed conveyor, are fed into channel guides so as to be oriented in side-by-side rows as has been previously taught by the prior art. According to the present invention, however, there is provided a spacing conveyor interposed between the feed conveyor and the outlet conveyor, normal to the feed conveyor, so that the feed conveyor feeds onto the spacing conveyor. The direction of travel of the conveying surface of the spacing conveyor is opposite to the direction of travel of the conveying surface of the outlet conveyor directly adjacent to it. Further, spacing guide means are positioned on the spacing conveyor at an angle so that the leading part of the spacing guide can split a row of the bottles apart and rush the row of bottles out toward the outlet conveyor at the angle generated by the spacing guide. Simultaneously, the retaining side of the spacing guide acts to retain the subsequent row of bottles and angles these rows out sufficiently to provide space for the leading edge of the spacing guide to plow in between it and the subsequent row of bottles. Additionally, there is provided a sensing device in the form of an electric eye and a light source and reflector. These are mounted across the outlet portion fo the feed conveyor at such an angle that the beam of light reflected across from the light source to the reflector and back to the receptor means of the electric eye, is intercepted by the neck of a bottle in an adjacent row. Therefore, the absence of a bottle in one of the rows will cause the drive means for the spacing conveyor to stop and thus prevent jamming of the entire mechanism.

BRIEF DESCRIPTION OF THE DRAWINGS

Referring now to the drawing.

DESCRIPTION OF THE PREFERRED EMBODIMENT

Figure 1:
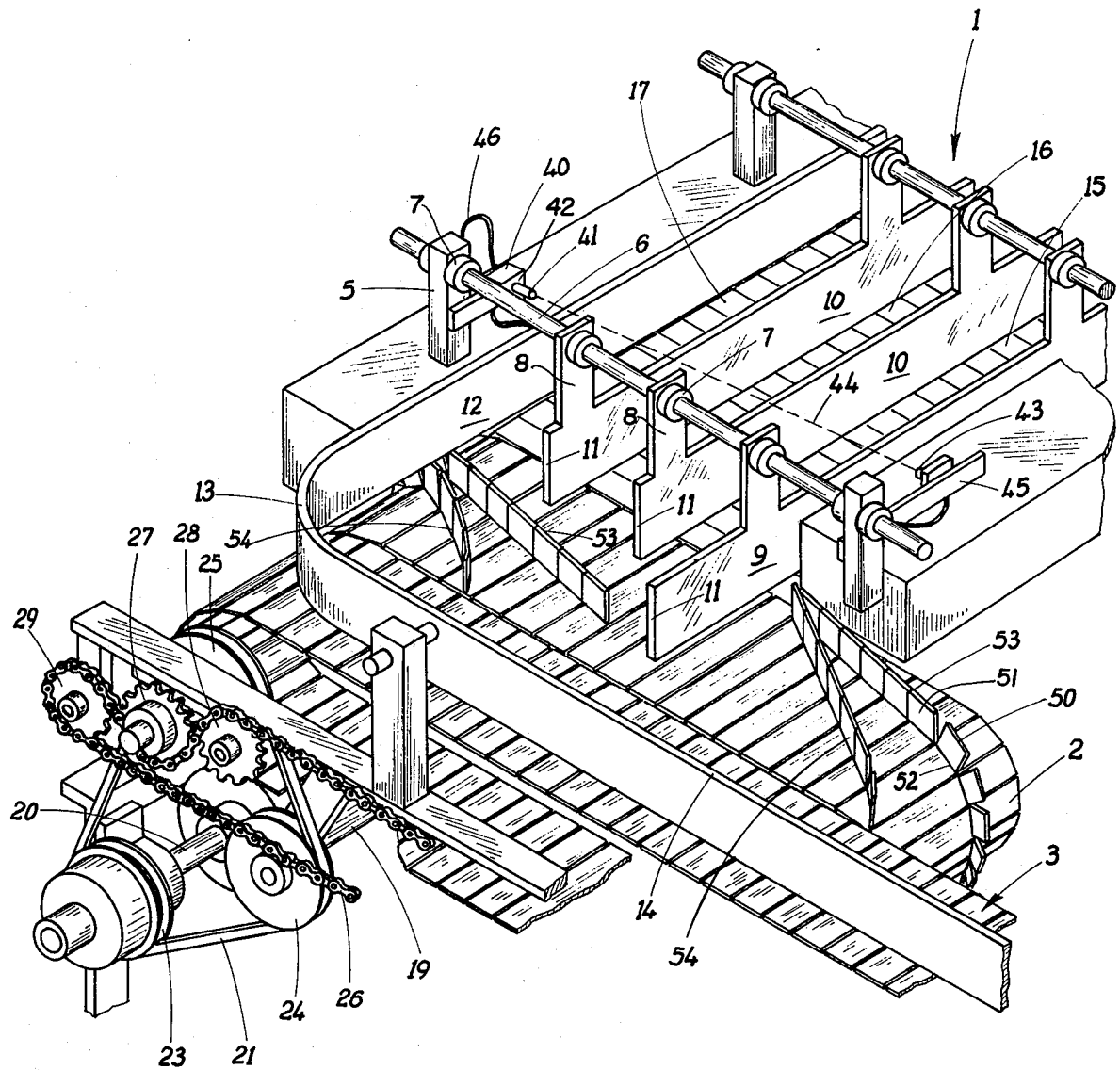
FIG. 1 is a view in perspective of the present invention illustrating the relations of the feed conveyor to the spacing conveyor and the relationship of the feed conveyor and spacing conveyor to the outlet conveyor.

Referring now to the drawings in detail. The feed conveyor 1 comprising an endless belt of flat articulated chain links as is indicated by FIG. 1 and moves in the direction illustrated by the arrow.

The spacing conveyor 2 made of flat articulated chain links is located with its long axis normal to the long axis of the feed conveyor 1 so that the feed conveyor feeds bottles onto the spacing conveyor. The conveying surface of the spacing conveyor moves in the direction illustrated which, it will be noted, is opposite to the direction of travel of the conveying surface of outlet conveyor 3. Again the outlet conveyor 3 is comprised of flat, articulated chain links.

Channel support means 8 are supported by means of transverse bars 6 through holes 7 mounted in posts 5 near the outlet portion of the feed conveyor 1. For purposes of description, the proximal channel guide 9 extends partially out over the spacing conveyor 2 while the middle channel guide means 10 are cut off at the end of the feed conveyor 1. The proximal channel guide 9 and the middle channel guide members 10, may extend across spacing conveyor 2 to the inner edge of outlet conveyor 3. This arrangement is shown in the modification illustrated in FIG. 5. On the other hand, the proximal channel member 9 and the middle channel members 10 may be cut off at the end of the feed conveyor 1. It is necessary, however, that the distal channel member 12 extend across the spacing conveyor 2 at least to the inner edge of outlet conveyor 3. The distal channel guide 12 in the preferred embodiments illustrated in FIGS. 1–4, is curved at point 13 and extends parallel to the outlet conveyor 3 to form a bumper 14. The channels produced then are 15 for the proximal, 16 for the medial and 17 for the distal. The motor illustrated generally as 19 is utilized as a drive means for both the spacing conveyor 2 and the outlet conveyor 3 although it is within the scope of this invention to run each of the conveyors by a separate driving means. In the modification illustrated in FIG. 3 and FIG. 1, however, the motor 19 is connected to shaft 20 which in turn is connected to belt 21 which is trained over drive sheave 23 tension sheave 24 and driven sheave 25. The driving chain 26 is trained over the tension sprocket 29 and trained under the drive sprocket 27 for outlet conveyor 3 and thence over drive the sprocket 28 for the spacing conveyor 2, and thence over the driven sprocket (not shown) for the spacing conveyor 2.

As previously indicated, a photoelectric cell 40 comprising a light source 41 and receptor means 42 and a reflector 43 is mounted near the outlet of the feed conveyor 1 so the post 45 of the reflector is somewhat upstream from the photoelectric cell 40. Thus a beam of light 44 from the light source to the reflector and back to the receptor means 42 is at somewhat of an angle. The beam of light 44, if projected as by line 64 from the light beam 44 intersects with a projected line 60 from guiding means 50 to form an acute angle a. This is best seen by reference to FIG. 2. Electric leads 46 to the starter motor (not shown) are in operative relation so that if the light beam 44 is not intercepted by an article on the inlet conveyor, the motor 19 is cut off, thus cutting off the drive means for the spacing conveyor 2 and outlet conveyor 3.

The guide means 50 in the preferred embodiment are made up of steel lugs 51 individually welded at point 52 to the links forming part of spacer conveyor 2. The lugs are welded in such a way as to form a retaining leg 53 angled slightly from the inner or medial side of the outlet conveyor 2, toward the middle of the conveyor 2. The guiding leg 54 is joined with the retaining leg 53 at its leading edge but then it curves in a terminal curve 55 to sweep toward the outlet conveyor 3 at the outer edge of conveyor 2.

Figure 2:
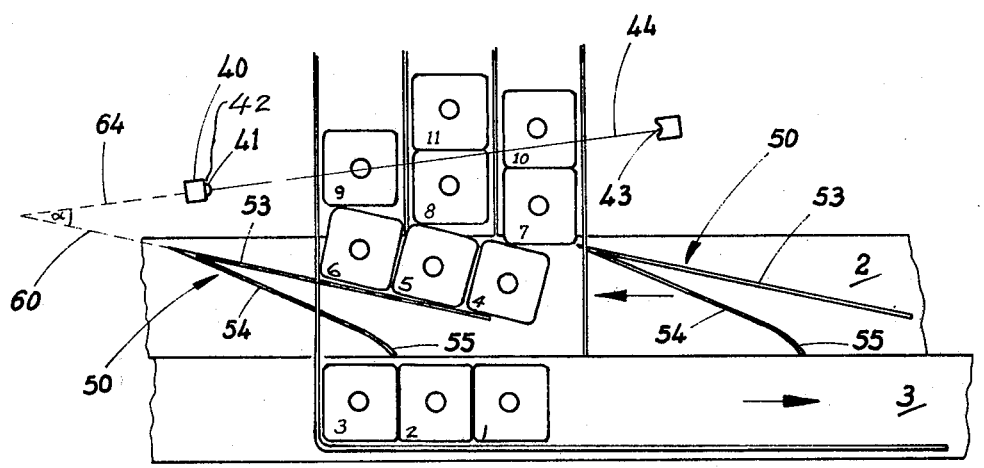
FIGS. 2, 3, and 4 are diagramatic illustrations of the machine of this invention in operation illustrating the relationship of the guide means in retaining, guiding and moving bottles from the feed conveyor to the outlet conveyor and which illustrates further the sensing device mounted so as to serially sense the presence or absence of a bottle or article in one of the side-by-side rows on the feed conveyor.
Figure 3:
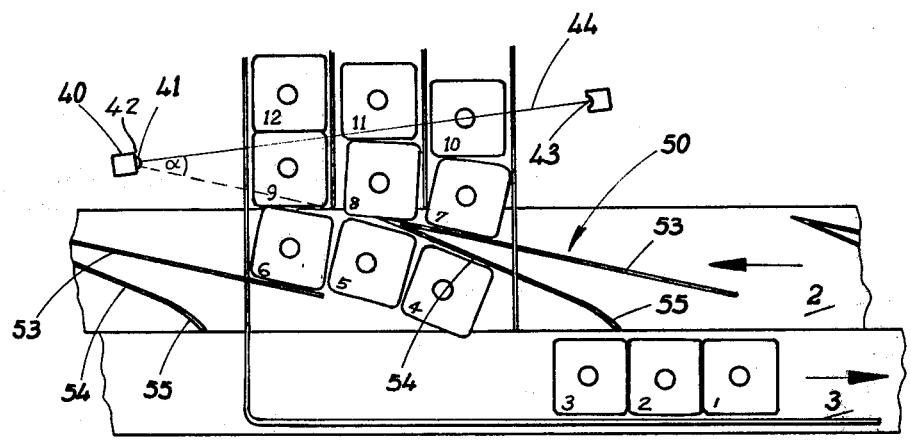

The operation of the conveyor and the guiding means can best be illustrated by reference to FIGS. 2, 3, and 4 wherein the bottles are shown numbered and 1 through 15 being fed from the feed conveyor onto the spacing conveyor and then outward to the outlet conveyor. It will be noted that in FIG. 2, bottles 1, 2, and 3 have already moved onto the outlet conveyor 3 and are moving in the direction shown by the arrow to the filling equipment. The bottles 4, 5, and 6 have assumed the angle generated by the retaining leg 53 so as to be in position for the leading edge of the guiding means 50 to separate the rows 4, 5, and 6 from rows 7, 8, and 9. Once this is accomplished, the rows 4, 5, and 6 are pushed by the guiding leg outwardly to the outlet conveyor so as to be fed off in one-by-one fashion. As will be noted, by reference to FIG. 4, the bottles 7, 8, and 9 are retained in angular position by the retaining leg 53 of the guiding means 50 and the subsequent rows illustrated by bottles 10, 11, and 12 begin to take on the angular configuration of the bottles in the preceding rows 7, 8, and 9. Thus, a light beam 44 reflected from reflector 43 through to the photoelectric cell 40 is diffused by passing through the neck of bottle 9 as illustrated in FIG. 2. As the bottles move forward following the angle of the retaining leg 53, the next bottle in the succeeding row 10, 11, and 12 block the light beam 44 as the light beam passes through the neck of the bottle 10, (FIG. 3).

Figure 4:
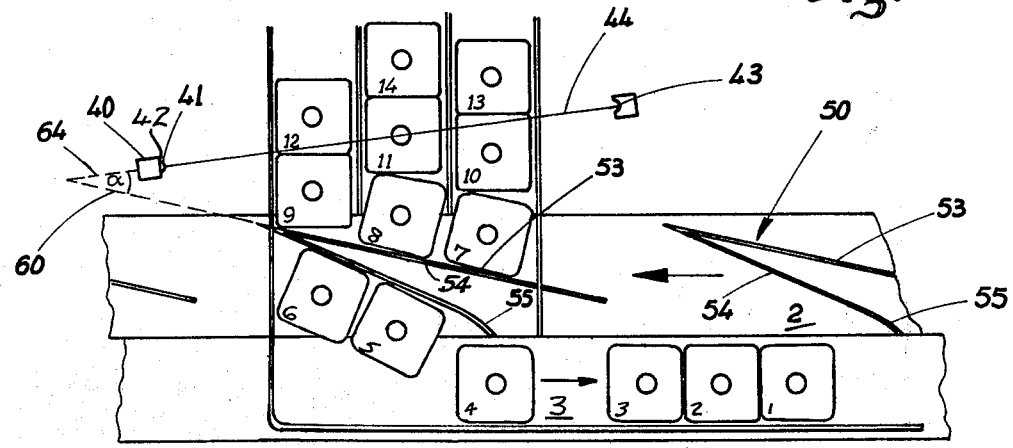

As the bottles move on forward as is shown in FIG. 4, the light beam 44 is blocked by the neck of bottle 11 and this repeats serially for each bottle through the series in side-by-side relation on the conveyor 1. Thus, if a bottle is missing, the light beam is not blocked and a signal is sent via leads 46 to the starter motor (not shown) to stop motor 19 and thus stop the spacing conveyor and outlet conveyor until the bottles on the feed conveyor are in proper alignment. This prevents the guide means 50 from hitting the bottles at the wrong angle and possibly breaking same on the conveyor. It should be clear that the angle of the light beam 44 is dependent to some extent upon the angle of the bottles following the retaining leg 53. Thus if a line is projected from the retaining leg 53, and designated 60, and another line is projected from the light beam 44 and designated 64, the two lines 60 and 64 would intersect and form an acute angle a, (FIG. 2).

Figure 5:
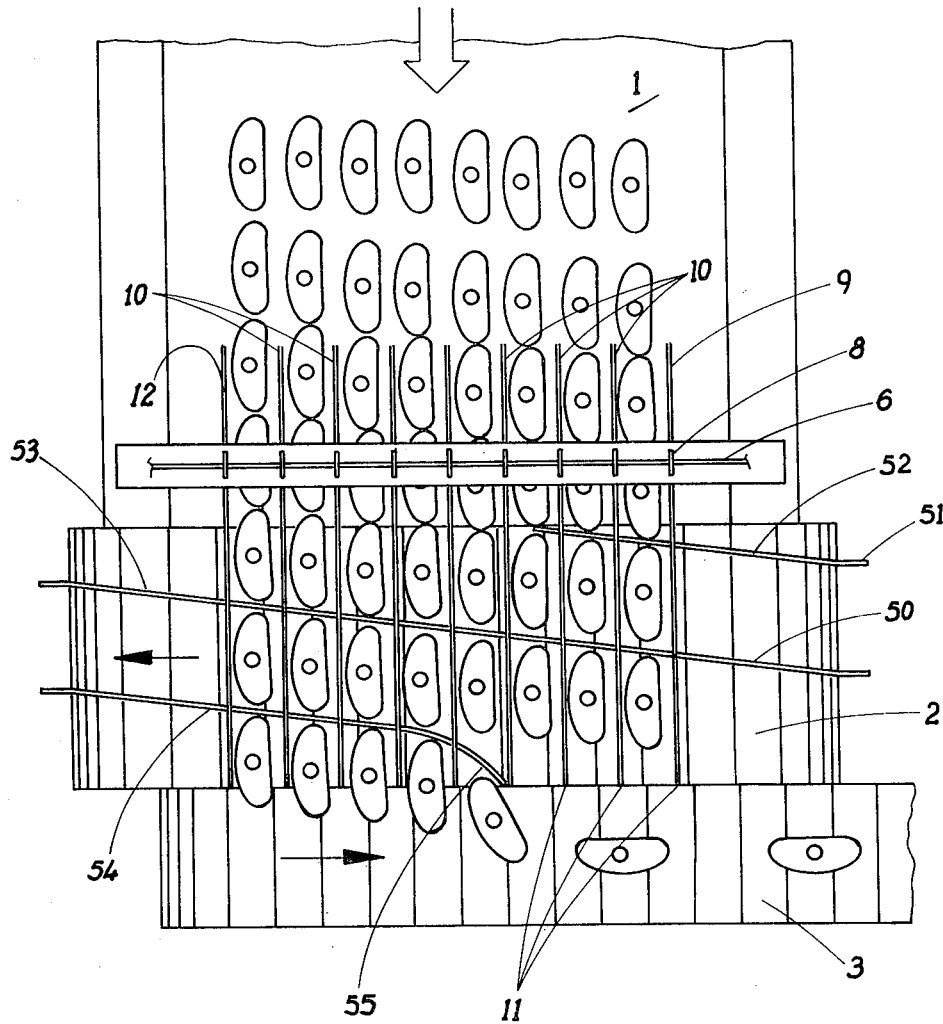
FIG. 5 is a plan view illustrating a modification of the proposed invention which is of special utility in feeding half pint bottles onto an outlet conveyor whereby the bottles are retained, pushed, guided and turned by the guide means to feed onto the outlet conveyor in one-by-one fashion.

Referring now to FIG. 5, it will be noted that the guide means in this modification is again made up of individual lugs 51 welded to the flat chain links forming the spacing chain conveyor 2, but that in this instance, the guide means forms a helical endless guide around the endless chain of the conveyor 2. Further, it will be noted that the channel means formed by proximal channel guides 9, middle channel guides 10 and distal channel guides 12 extend all the way across the spacing conveyor and their ends 11 terminate at the start of the outlet chains of conveyor 3, thus the pint bottles feeding into the channels formed by the channel guides 9, 10, and 12 retain the bottles in proper configuration as the guide means push the bottles in one-by-one fashion onto the outlet conveyor 3.

Since the direction of the conveying surface of conveyor 3 is opposite to the direction of the conveying surface of conveyor 2, the pint bottles fulcrum around the ends 11 of the channel guides and are turned in the proper direction to be fed on the outlet chain conveyor to the filling apparatus.

Many modifications will occur to those skilled in the art from the detailed description herein above given and such is meant to be exemplary in nature and non-limiting except so as to be commensurate in scope with the appended claims.

I claim:

1. A machine for feeding groups of articles in one-by-one fashion onto an outlet conveyor, which comprises
    A. a longitudinal feed conveyor located at right angles to said outlet conveyor for receiving groups of articles and for moving same toward said outlet conveyor;
    B. channel means comprising proximal middle and distal channel members disposed above said feed conveyor for orienting said articles into a plurality of side-by-side rows on said conveyor,
        1. said distal channel member extending to the edge of said outlet conveyor;
    C. the improvement of a spacing conveyor interposed between said feed conveyor and said outlet conveyor,
        2. said spacing conveyor lying adjacent and parallel to said outlet conveyor and normal to said feed conveyor so as to receive articles from said feed conveyor for delivery onto said outlet conveyor,
        2. the direction of the conveying surface of said spacing conveyor being opposite to the direction of the conveying surface of said outlet conveyor;
    D. drive means for said spacing conveyor;
    E. the further improvement of an obliquely disposed guide means on said spacing conveyor for simultaneously retaining, guiding and pushing articles transversely across said spacing conveyor, and onto said outlet conveyor in a one-by-one fashion.

2. A machine, as defined in claim 1, in which said guide means is in the form of a V with the tip of the V starting at the inner edge of said spacing conveyor adjacent to said feed conveyor and with the legs of said V trailing obliquely toward the outer edge of said spacing conveyor adjacent to said outlet conveyor, the leg of said V, adjacent to the inner edge of said spacing conveyor acting as a retaining leg and the leg of said V, adjacent to the outer edge of said spacing conveyor, acting as a guiding and pushing leg of said guide means.

3. A machine, as defined in claim 2, in which the inner retaining leg of said V-shaped guiding means is longer than the outer guiding leg of said guide means.

4. A machine, as defined in claim 3, in which the guiding leg of said V-shaped guide means is curved to sweep toward the outer edge of said spacing conveyor adjacent to said outlet conveyor.

5. A machine, as defined in claim 1, in which
 A. said spacing conveyor is an endless flat top chain conveyor comprising a series of flat chain links hinged together, and
 B. said guide means comprises a series of lugs, each of which is obliquely welded to one of said flat chain links.

6. A machine, as defined in claim 1, the further combination therewith of an elongulated bumper member extending along the lateral edge of said outlet conveyor.

7. A machine, as defined in claim 1, in which:
 A. the members of said channel means extend across the width of said spacing conveyor.

8. A machine, as defined in claim 1, in which:
 A. the distal end member of said channel means extends across the width of said spacing conveyor and across a portion of said outlet conveyor.

9. A machine, as defined in claim 8, in which the terminal portion of said distal member is curved so as to sweep in the direction of travel of the conveying surface of the outlet conveyor.

10. A machine, as defined in claim 1, in which:
 A. said spacing conveyor is an endless conveyor and
 B. said obliquely disposed guide means is helically arranged along said endless conveyor,
  2. the leading edge of said helically arranged guide means starting at the inner edge of said spacing conveyor adjacent to said feed conveyor, and
  2. said trailing edge of said helically arranged guide means ending near the outer edge of said spacing conveyor adjacent to the outlet conveyor.

11. A machine, as defined in claim 10, in which said trailing edge of said guide means is curved so as to sweep toward said outlet conveyor.

* * * * *

UNITED STATES PATENT OFFICE
CERTIFICATE OF CORRECTION

Patent No. 3,952,855         Dated   April 27, 1976

Inventor(s)  James H. Rogers

It is certified that error appears in the above-identified patent and that said Letters Patent are hereby corrected as shown below:

Column 1, line 59, "rush" should read -- push --.

Column 6, line 20, Claim 10, the number "2" should read -- 1 --.

Signed and Sealed this

Ninth Day of November 1976

[SEAL]

Attest:

RUTH C. MASON
Attesting Officer

C. MARSHALL DANN
Commissioner of Patents and Trademarks